No. 747,901. PATENTED DEC. 22, 1903.
F. J. DE WITT.
MACHINE FOR AUTOMATICALLY SHAPING MASSES OF DOUGH TO THE FORM REQUIRED FOR LOAVES.
APPLICATION FILED JUNE 8, 1903.
NO MODEL. 3 SHEETS—SHEET 1.

Witnesses.
Ernest Pulford
Robert Ellsworth

Inventor,
F. J. de Witt
By his Attys
Baldwin, Davidson & Wight

No. 747,901. PATENTED DEC. 22, 1903.
F. J. DE WITT.
MACHINE FOR AUTOMATICALLY SHAPING MASSES OF DOUGH TO THE FORM REQUIRED FOR LOAVES.
APPLICATION FILED JUNE 8, 1903.
NO MODEL. 3 SHEETS—SHEET 2.

Witnesses
Inventor
F. J. de Witt
By his Attys

No. 747,901. PATENTED DEC. 22, 1903.
F. J. DE WITT.
MACHINE FOR AUTOMATICALLY SHAPING MASSES OF DOUGH TO THE FORM REQUIRED FOR LOAVES.
APPLICATION FILED JUNE 8, 1903.
NO MODEL. 3 SHEETS—SHEET 3.

Witnesses
Ernest Pulsford
Robert Ellsworth

Inventor
F. J. de Witt
By his attys,
Baldwin Davidson Wight

No. 747,901. Patented December 22, 1903.

UNITED STATES PATENT OFFICE.

FREDERICK JOHN DE WITT, OF CARDIFF, ENGLAND, ASSIGNOR TO ALBERT CHARLES MACINTOSH, OF CARDIFF, WALES, ENGLAND.

MACHINE FOR AUTOMATICALLY SHAPING MASSES OF DOUGH TO THE FORM REQUIRED FOR LOAVES.

SPECIFICATION forming part of Letters Patent No. 747,901, dated December 22, 1903.

Application filed June 8, 1903. Serial No. 160,601. (No model.)

*To all whom it may concern:*

Be it known that I, FREDERICK JOHN DE WITT, miller, a subject of the King of Great Britain, residing at No. 7 Telford street, Cardiff, in the county of Glamorgan, Wales, England, have invented a Machine for Automatically Shaping Masses of Dough to the Form Required for Loaves, of which the following is a specification.

This invention relates to an improved apparatus whereby dough may be caused automatically to be molded to the requisite shape for forming a loaf without being manipulated by hand.

It consists in providing a number of bowls which are so mounted that they pass successively underneath a chute which is fed with lumps of unshaped dough and which deliver those lumps to the bowls. After receiving the dough the bowls are each automatically closed by a hinged lid and are carried around on a revolving drum, being so mounted on the drum as to be subjected to a vibratory motion relatively thereto, the vibration consisting of swinging about a radially-placed pivot which reciprocates in a direction parallel to the axis of the drum. The combined effect of the vibration and the inversion of the bowls in their circular motion around the drum is to cause the dough to acquire the desired shape at the end of their excursion, whereon the lids, which were automatically closed against the force of a spring, are released when the bowls are in a partially-inverted position, allowing the molded dough to be delivered onto a traveling band, by which it is conducted to the oven.

By reference to the accompanying drawings, which form a portion of my specification, I will now describe the construction of the apparatus by which the previously-mentioned operations may be effectively performed.

Figure 1:
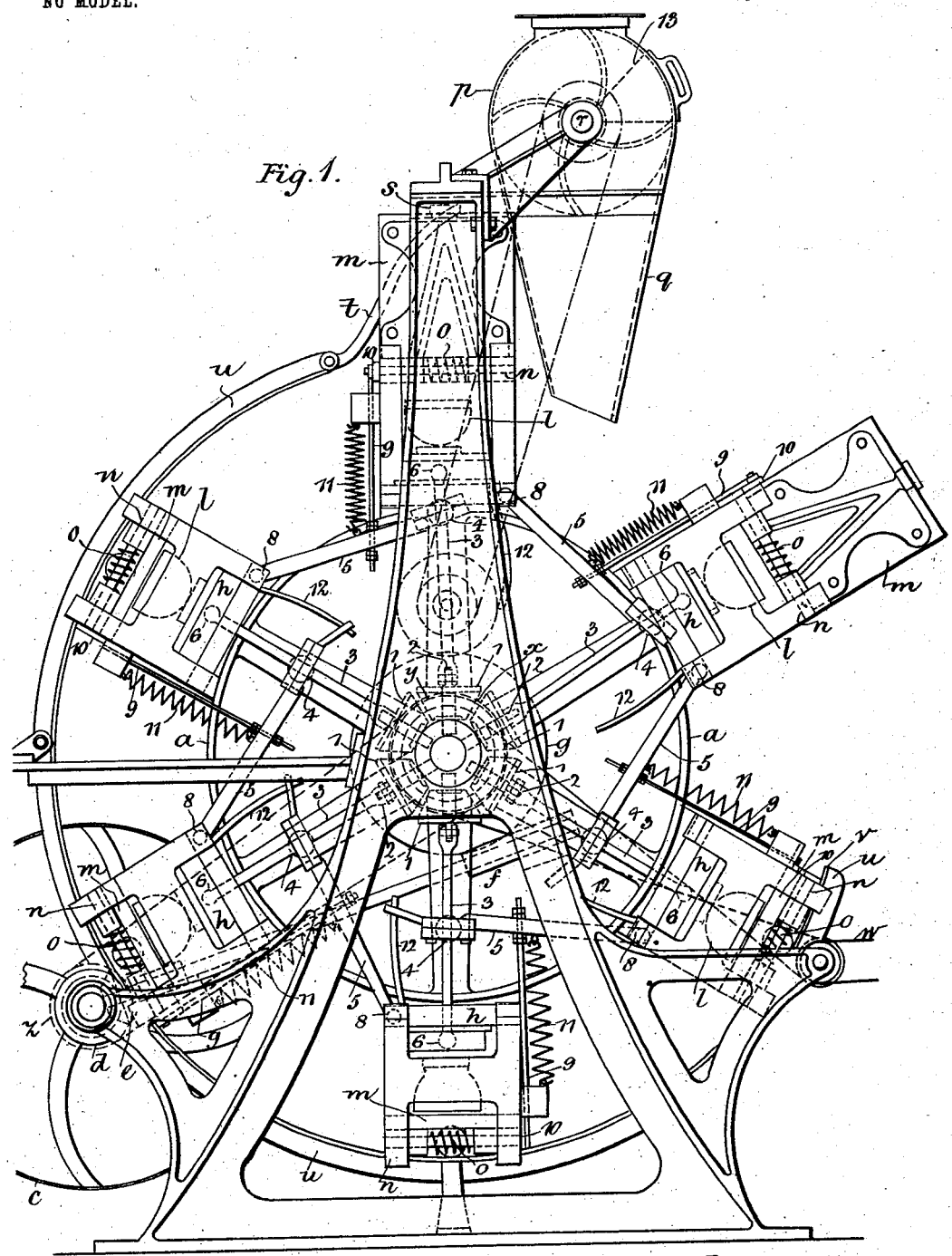
Figure 2:
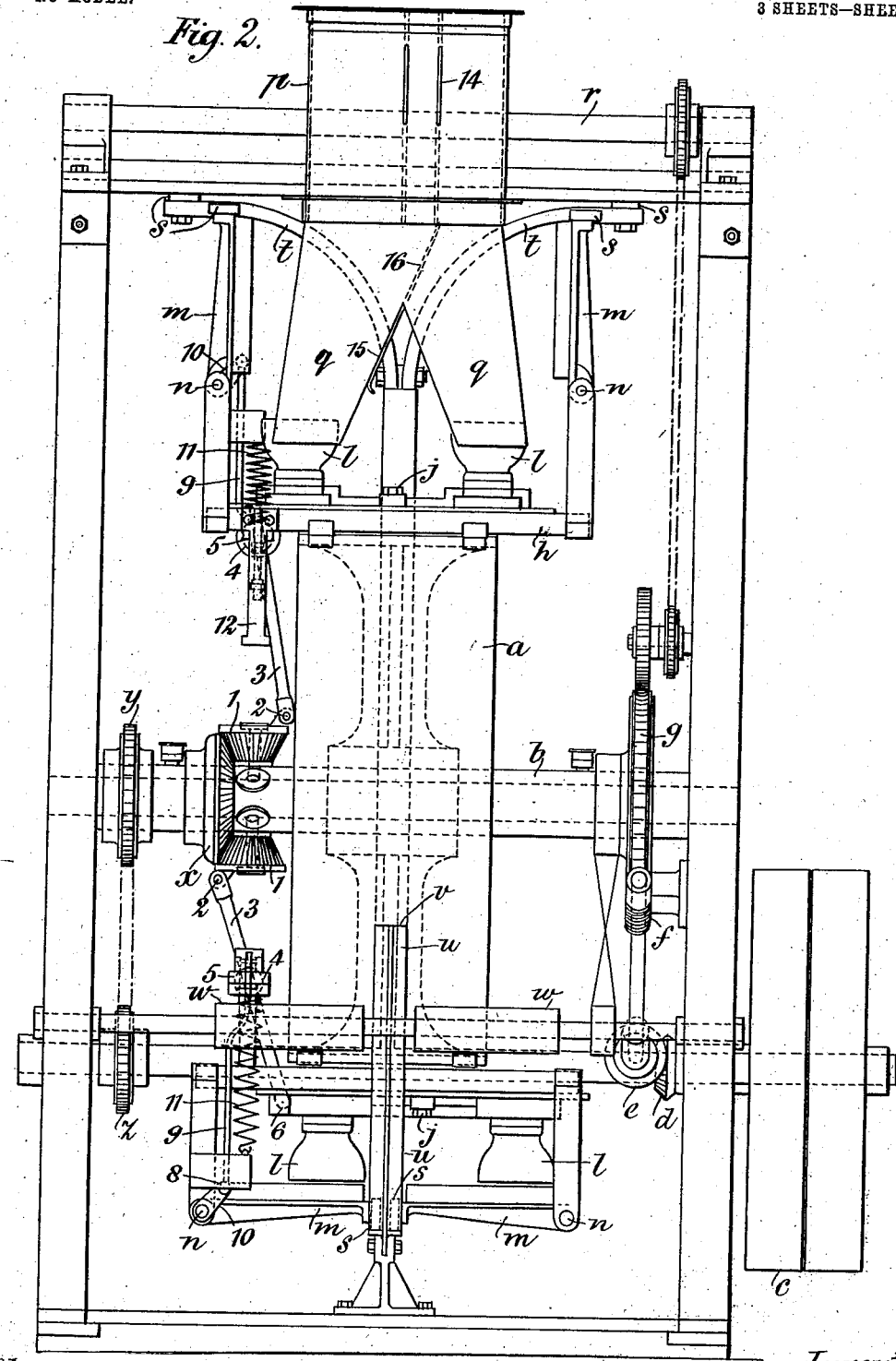
Figure 3:
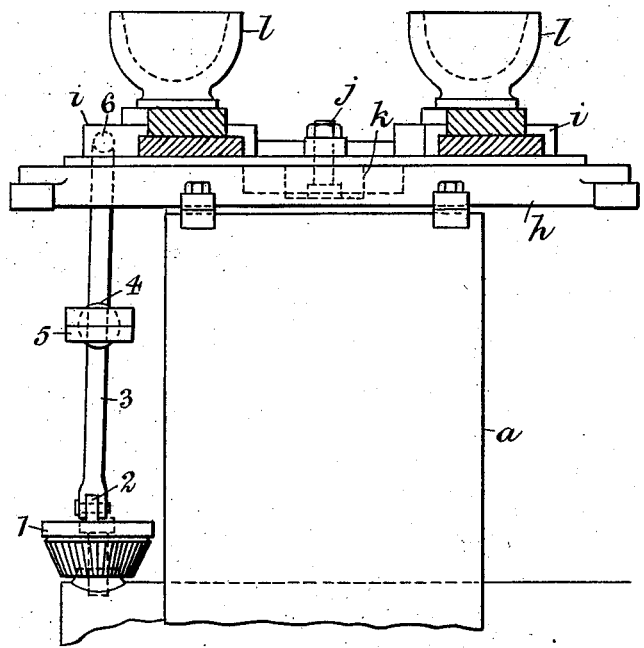
Figure 4:
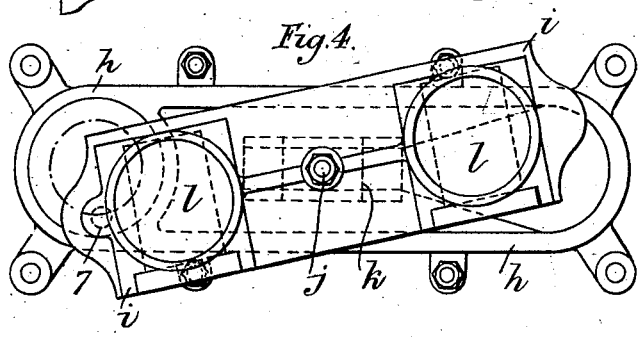

In the drawings, Figure 1 is a side elevation of the machine. Fig. 2 is a front elevation in which for the sake of clearness all but two of the molding-bowls and their gear are omitted. Fig. 3 is an enlarged elevation of a part of the apparatus, and Fig. 4 is a plan of the same.

In the views, $a$ is a drum, which is keyed to the shaft $b$, which is mounted in the frame of the machine and driven by a belt and pulley $c$ through the medium of the bevel-wheels $d$ and $e$ and the worm and worm-wheel $f$ and $g$. To the drum are secured at equal angular intervals six castings $h\ h$, each of which carries a table $i$, movable thereon. The table $i$ is pivoted on a stud $j$, which is secured to a block $k$, capable of sliding in a slotway in the casting $h$. To each table two bowls $l\ l$ are secured, and these bowls are adapted to be closed each by a lid $m$, which is pivoted on a pin $n$ in such a manner that it tends to open under the action of a helical spring $o$.

To the upper portion of the machine a casing $p$, having two chutes $q\ q$, is secured, the casing containing a boss provided with four curved arms, which is keyed to a shaft $r$, mounted so as to revolve in the frame of the machine. Shapeless masses of dough are fed into the casing and received between the arms, from which they are delivered at suitably-regulated intervals through the chutes into the bowls which pass underneath, the delivery being suitably timed by the use of a pitch-chain and sprocket-wheels to drive the shaft $r$.

Each lid which is pivoted on a pin $n$ carries a roller $s$, which in the movement of the machine comes into contact with a roller-race $t$, which is curved in such a way as to force the lids into the position to close the bowls, and afterward a circular race $u$ retains them in the closed position until they arrive at the end $v$ of the said race. In this position the lids fly open, and as the bowls are at this time nearly inverted the molded masses of dough will roll out onto an endless band $w$, by means of which they will be conducted away from the machine, the band being driven from the shaft $b$ by means of a crossed belt.

The vibratory movement of the tables $i$ relatively to the castings $h$, on which they are mounted, is derived as follows: A bevel-wheel $x$ is keyed to a sleeve which revolves freely on the shaft $b$, being driven by a pitch-chain and a pair of sprocket-wheels $y\ z$, the latter of which is keyed on the main driving-shaft, which carries the pulley $c$. The wheel $x$ actuates a set of bevel-wheels 1 1, which are mounted on studs carried by the shaft $b$, there being a wheel 1 for each table fitted to the revolving drum. Each wheel 1 has a pin-joint connection 2 with a rod 3. The rod 3 passes through a sphere 4, which is suitably carried on and fitted into a lever 5, forming thereby a ball-and-socket joint, and the end 6 of the rod 3, which is made spherical, fits into a recess 7, which is provided in the table $i$. The pin-joint 2 moves in a circle of constant radius relatively to the drum $a$, and the end 6 of the rod 3 moves also in a circle, the radius of which depends on the position of the ball-and-socket joint 4 5, being small when the ball-joint is near the end 6 and larger when it is moved toward the joint end 2. By such means the point 7 of the table $i$ is required to move in a circle, and its center $j$, as previously described, reciprocates in a straight line. The combined effect of these two motions is to cause the bowls to move in a somewhat elliptical path, which when associated with the rotation of the drum effecting inversion of the bowls produces the desired shaping effect on the contained masses of dough. The position of the ball-and-socket joint 4 5, on which the amplitude of the vibration of the table depends, is determined by the position of the lever 5. Each lever 5 is pivoted on a pin 8 and is attached by a link 9, provided with adjustable nuts and lock-nuts, to a small crank 10, which is moved about the pin $n$, on which the cover $m$ is hinged, the crank 10 moving to an outward position when the cover is open and to an inward position when the cover is closed. Associated with each link is a helical spring 11, which is in tension. A curved rod 12 acts as a guide to the end of the lever 5. When in the rotation of the drum the roller $s$ on the cover arrives at the end $v$ of the circular race $u$, the cover will fly open under the impelling force of the two springs $o$ and 11 and cause the lever 5 to draw the ball-and-socket joint 4 5 toward the end 6 of the rod 3 and cause the vibratory movement of the table and the bowls carried by it to be a minimum. This will facilitate the removal of the shaped piece of dough and the recharging of the bowl with an unshaped piece. When after the roller $s$ has traveled along the curved race $t$ the cover is closed, the ball-joint will be thrust away from the end 6 of the rod 3, and the vibratory motion of the bowls will be increased to the amount desired for the purpose of shaping the dough.

A single lump of dough fed into the casing $p$ is divided into two parts by a knife 13, which is thrust through a slit in the casing, the curved arms being discontinuous at the place where the knife is inserted. When it is desired to divide the dough into two equal portions, the knife is inserted through a slit at the center; but if it is desired to make what is known as a "cottage-loaf," which is formed of two globular-shaped portions, one being smaller than the other, the knife is inserted in the slit 14, and the mass of dough will be unequally divided, as desired. In order that the larger portion may be directed into its own proper chute, a guiding diaphragm 15 is provided, which can be slid into the position shown by the dotted line 16.

Instead of fitting six vibrating tables to the drum any other number may be adopted in accordance with the desired capacity of the machine.

What I claim is—

1. In a machine for shaping masses of dough, the combination of a table, means for rotating the table about a center, a bowl carried on the table, means for vibrating the bowl relatively to the table, and means for supplying the bowl with masses of dough.

2. In a machine for shaping masses of dough, the combination of a table, means for rotating the table about a center, a bowl carried on the table, means for vibrating the bowl relatively to the table, a cover for the bowl, means for closing and opening the cover, and means for supplying the bowl with masses of dough.

3. In a machine for shaping masses of dough, the combination of a table, means for rotating the table about a center, a bowl carried on the table, means for imparting to the bowl a variable vibratory movement, means for reducing this movement to a minimum when the bowl is to be supplied with dough, and means for supplying the bowl with masses of dough.

4. In a machine for shaping masses of dough, the combination of a table, means for rotating the table about a center, a bowl carried on the table, means for vibrating the bowl relatively to the table, a cover for the bowl pivoted at one side to the table, a curved guide for the other side of the cover adapted to close the cover when the bowl has been filled and to open it when the contents are to be discharged, and means for supplying the bowl with masses of dough.

5. In a machine for shaping masses of dough, the combination of a table, means for rotating the table about a center, a bowl carried on the table, means for imparting to the bowl a variable vibratory movement, means for reducing this movement to a minimum when the bowl is to be supplied with dough, a cover for the bowl, means for closing and opening the cover, and means for supplying the bowl with masses of dough.

6. In a machine for shaping masses of dough, the combination of a shaft, means for continually rotating it, a drum fast on the shaft, a casting carried by the drum, a block capable of sliding in a slot in the casting, a table pivoted to the block, a stud-axle radial to the shaft, a disk rotating continually about the axle, a lever having one end jointed to the axle and the other to the table, means for shifting the fulcrum of this lever, and means for supplying the bowl with masses of dough.

7. In a machine for shaping masses of dough, the combination of a hopper, two chutes depending therefrom, a shaft in the hopper, arms on the shaft, an adjustable knife in the hopper adapted to divide the dough placed in the hopper, and means for rotating the shaft.

FREDERICK JOHN DE WITT.

Witnesses:
   ROBERT B. RANSFORD,
   J. H. WHITEHEAD.